United States Patent [19]
Jonas et al.

[11] Patent Number: 5,959,132
[45] Date of Patent: Sep. 28, 1999

[54] MONONUCLEAR AND POLYNUCLEAR TRANSITION METAL COMPLEXES WITH PENTALENE LIGANDS BOUND TO SINGLE METAL ATOMS

[75] Inventors: Klaus Jonas, Mülheim an der Ruhr; Peter Kolb, Moers; Guido Kollbach, Straelen, all of Germany

[73] Assignee: Studiengesellschaft Kohle mbH, Mulheim an der Ruhr, Germany

[21] Appl. No.: 08/933,205

[22] Filed: Sep. 17, 1997

[30] Foreign Application Priority Data

Aug. 14, 1997 [DE] Germany .............................. 197 35 259

[51] Int. Cl.$^6$ .............................. C07F 17/00; C07F 7/00; C08F 4/643
[52] U.S. Cl. .................................. 556/15; 556/1; 556/43; 556/53; 556/58; 534/15; 526/126; 526/160; 526/943
[58] Field of Search .................................. 556/1, 43, 53, 556/58, 15; 534/15; 526/160, 943, 126

[56] References Cited

FOREIGN PATENT DOCUMENTS 4417542 11/1995 Germany .

OTHER PUBLICATIONS

Oelckers et al., Organometallics, vol. 12, No. 9, pp. 3396–3397, 1995.

*Primary Examiner*—Porfirio Nazario-Gonzalez
*Attorney, Agent, or Firm*—Sprung Kramer Schaefer & Briscoe

[57] ABSTRACT

The invention relates to a complex compound having at least one transition metal atom, characterized in that said complex compound contains at least one pentalene or substituted pentalene ligand which is coordinated to only one single metal atom.

14 Claims, No Drawings

MONONUCLEAR AND POLYNUCLEAR TRANSITION METAL COMPLEXES WITH PENTALENE LIGANDS BOUND TO SINGLE METAL ATOMS

The present invention relates to mononuclear and polynuclear complex compounds of transition metals with complex-bound pentalene or complex-bound pentalene derivatives, their preparation and their use as catalysts or catalyst precursors. The materials according to the invention are characterized by comprising at least one pentalene or substituted pentalene ligand which is coordinated to only one single metal atom. In addition, the present invention relates to novel transition metal complexes which can be prepared from mononuclear pentalene-transition metal complexes, and their use as catalysts.

It is well-known that the five-membered carbocycle cyclopentadienyl (Cp) is one of the most commonly used ligands in organometallic chemistry, together with its most important variants, pentamethylcyclopentadienyl (Cp$^*$) and indenyl (Ind). In connection with the homogeneously catalyzed stereo-specific olefin polymerization, the metallocene derivatives which have gained essential importance as catalyst components have been those, in particular, the five-membered ring ligands of which are linked together via a $CH_2$—$CH_2$ or $Si(CH_3)_2$ bridge (Angew. Chem. 107, 1255 (1995); Chem. Unserer Zeit 28, 197 (1994)).

To date, transition metal complexes with coordinated pentalene, a bicyclic ligand having two five-membered carbocyclic rings, have been known only of the transition metals of groups 8 to 10 (iron, ruthenium, cobalt, rhodium, nickel). These compounds are polynuclear complexes, and the metal-coordinated bicyclic rings in these compounds exclusively function as planar or essentially planar bridging ligands (J. Am. Chem. Soc. 117, 6182 (1995); Acc. Chem. Res. 7, 321 (1974)).

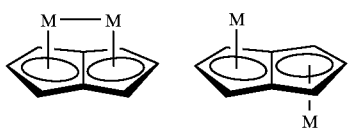

In contrast, transition metal complexes in which pentalene or substituted pentalene is coordinated to one single metal atom have not been known. Therefore, it has been the object of the present invention to provide such complex compounds.

It has been found that this is possible by the process claimed in this invention. This does not only mean an enrichment of organometallic complex chemistry by a variety of novel compounds, but also opens the gate to novel catalysts.

In the metal complexes according to the invention, coordination of pentalene to one single metal atom can take place through all eight ring carbon atoms (coordination type A), but coordination through less carbon atoms, e.g. through only four carbon atoms (coordination type B), is also possible. Numerous single-crystal structural analyses provided evidence that the first coordination type, A, is characterized by the strong folding of the pentalene ligand or substituted pentalene ligand along the bond between the two bridging carbon atoms.

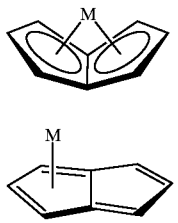

A

B

The following drawing shows the molecular structure of the mononuclear pentalene vanadium complex cyclopentadienylpentalenevanadium (20a) as revealed by X-ray cristallography.

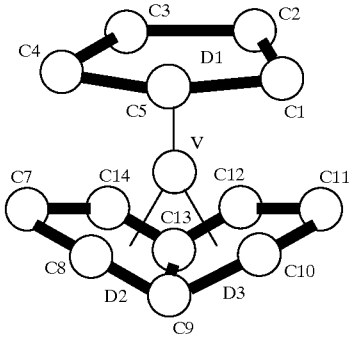

Molecular structure of $Cp(\eta^8-C_8H_6)V$ (20a) in the crystal

In particular, the invention relates to complex compounds of general formulae I, II, III or IV,

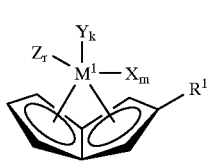

I

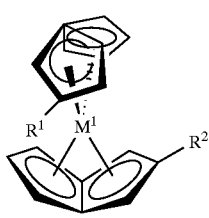

II

III

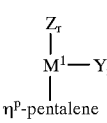

$\eta^p$-pentalene

IV

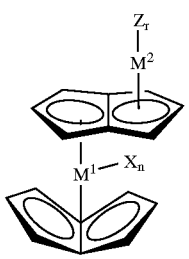

wherein $M^1$ and $M^2$ are the same or different metal atoms, at least one of the atoms being from the groups 3 to 6, $R^1$, $R^2$ are independently H or methyl, X is halogen, alkyl, aryl or H, Y is THF, amine, phosphane or CO, Z is a π-ligand, preferably cyclopentadienyl, pentamethylcyclopentadienyl, dihydropentalenyl, indenyl or allyl, k is 0, 1 or 2, m is 0, 1, 2 or 3, n is 0 or 1, r is 0, 1 or 2, and $2 \leq p \leq 8$.

The complex compounds may also be present as a cation or anion.

Preferred metals are scandium, titanium, zirconium, hafnium, vanadium, niobium and chromium.

In addition to the unsubstituted pentalene ligand, 2-methyl-pentalene, for example, may also be used as a ligand.

The complex compounds according to the invention are useful as catalysts for olefin polymerization, e.g., for the polymerization of ethene, especially certain pentalene zirconium complexes.

In addition, there is claimed a process for the preparation of a large part of the pentalene complexes according to the invention. This process is characterized in that a transition metal compound which has both at least one halogeno and at least one cyclopentadienyl, substituted cyclopentadienyl, or indenyl ligand is used as the starting material, and that said starting material is reacted with a pentalene dianion or a substituted pentalene dianion which replaces one halogeno ligand and one cyclopentadienyl, substituted cyclopentadienyl, or indenyl ligand. The dihydropentalenes required for the synthesis of the dianions can be prepared by methods known from the literature (Synthesis 144 (1990)), and their conversion to the corresponding dianions is achieved, as with other CH-acidic compounds, by metallation, e.g., with butyllithium in tetrahydrofuran. The preparation of the pentalene-transition metal complexes obtainable by the process according to the invention will be illustrated by the synthesis of the zirconium complexes $Cp(C_8H_6)ZrCl$ (12a) and $(C_8H_6)_2Zr$ (13a) as examples according to the following reaction scheme.

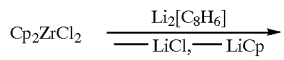

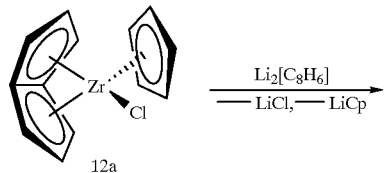

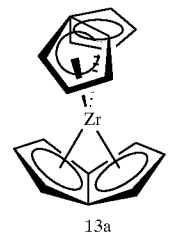

Some of the complex compounds according to the invention can be prepared from other compounds according to the invention by appropriate chemical reactions. Suitable types of reaction for such conversions are oxidation, e.g., with halogenated hydrocarbons, metallation, e.g., with butyllithium, or reduction with alkali metals, optionally followed by reaction with electrophiles, addition of electrophiles, e.g., addition of HX, $(CH_3)_3SiCl$ or $(C_2H_5)_2BCl$, or of nucleophiles, e.g., organometallic compounds of the main group metals, especially the alkali metals, optionally followed by reaction with electrophiles, metathetical reactions with organometallic compounds of the main group metals, optionally followed by protolysis with Brønsted acids of weakly coordinating anions, e.g., in the form of $[R_3NH][B(C_6H_5)_4]$, as well as comproportionation by reaction with a suitable transition metal compound.

In addition, another group of novel transition metal complexes is also made available by such reactions. These are also useful as catalyst components, e.g., for the polymerization of ethene; however, they no longer have a pentalene ligand bound to one single metal atom, but contain at least one dihydropentalenyl or substituted dihydropentalenyl ligand, or a bridging pentalene or bridging substituted pentalene ligand. Four selected compounds from this group are schematically depicted below.

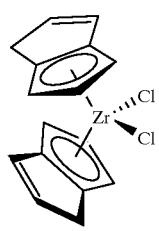

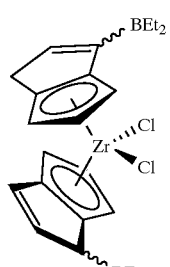

-continued

25

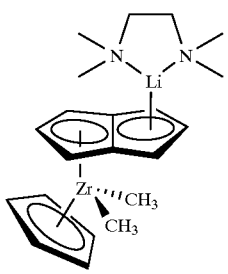

26

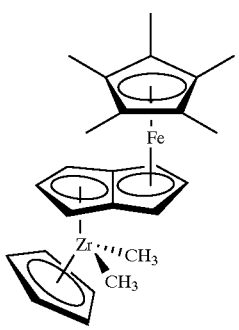

EXAMPLES

1. Examples of transition metal complexes according to the invention
a) The following transition metal complexes according to the invention having pentalene ligands or substituted pentalene ligands bound to single metal atoms have been prepared:

Cp($\eta^8$-C$_8$H$_6$)(thf)Sc (1a), Cp$^*$($\eta^8$-C$_8$H$_6$)(thf)Sc (1b), Ind($\eta^8$-C$_8$H$_6$)(thf)Sc (1c)

Cp($\eta^8$-C$_8$H$_6$)Ti(2a), Cp$^*$($\eta^8$-C$_8$H$_6$)Ti (2b), Ind($\eta^8$-C$_8$H$_6$)Ti (2c), ($\eta^5$—C$_8$H$_7$)($\eta^8$-C$_8$H$_6$)Ti (2d), Cp($\eta^8$-C$_8$H$_5$CH$_3$)Ti (2e), ($\eta^8$-C$_8$H$_6$)$_2$Ti (3a), ($\eta^8$-C$_8$H$_5$CH$_3$)$_2$Ti (3b), Cp($\eta^8$-C$_8$H$_6$)TiCl (4a), Cp($\eta^8$-C$_8$H$_6$)TiBr (4b), Ind($\eta^8$-C$_8$H$_6$)TiCl (4c), Ind($\eta^8$-C$_8$H$_6$)TiBr (4d), ($\eta^5$—C$_8$H$_7$)($\eta^8$-C$_8$H$_6$)TiCl (4e), ($\eta^5$—C$_8$H$_7$)($\eta^8$-C$_8$H$_6$)TiBr (4f), ($\eta^8$-C$_8$H$_6$)((CH$_3$)$_2$PCH$_2$CH$_2$P(CH$_3$)$_2$)TiCl$_2$ (4g), Cp($\eta^8$-C$_8$H$_5$CH$_3$)TiCl (4h), Cp($\eta^8$-C$_8$H$_5$CH$_3$)TiBr (4i), Li[($\mu$—C$_8$H$_6$)Ti($\eta^8$-C$_8$H$_6$)] (5)

($\eta^5$—C$_8$H$_6$D)($\eta^8$-C$_8$H$_6$)Ti (6a), ($\eta^8$-CH$_8$H$_6$)Ti($\mu$—$\eta^5$:$\eta^5$—C$_8$H$_6$)FeCp$^*$ (6b), ($\eta^8$-C$_8$H$_6$)Ti($\mu$—$\eta^5$:$\eta^5$—C$_8$H$_6$)CoCp$^*$ (6c), ($\eta^8$-C$_8$H$_6$)TiCl($\mu$—$\eta^5$:$\eta^5$—C$_8$H$_6$)Co($\eta^4$-1,5-cyclooctadiene) (6d), ($\eta^8$-C$_8$H$_6$)Ti($\mu$—$\eta^5$:$\eta^5$—C$_8$H$_6$)Co((C$_3$H$_7$)$_2$P(CH$_2$)$_3$P(C$_3$H$_7$)$_2$) (6e)

($\eta^5$—C$_8$H$_6$Si(CH$_3$)$_3$)($\eta^8$-C$_8$H$_6$)TiCl (7a), ($\eta^5$—C$_8$H$_6$Si(CH$_3$)$_3$)($\eta^8$-C$_8$H$_6$)TiBr (7b), ($\eta^8$-C$_8$H$_6$)TiCl($\mu$—$\eta^5$:$\eta^5$—C$_8$H$_6$)FeCp$^*$ (7c)

Li[($\mu$—C$_8$H$_6$)Ti($\eta^8$-C$_8$H$_6$)(CH$_3$)] (8)

($\eta^5$—C$_8$H$_6$D)($\eta^8$-C$_8$H$_6$)(CH$_3$)Ti (9a), ($\eta^8$-C$_8$H$_6$)(CH$_3$)Ti($\mu$—$\eta^5$:$\eta^5$—C$_8$H$_6$)FeCp$^*$ (9b), ($\eta^8$-C$_8$H$_6$)(CH$_3$)Ti($\mu$—$\eta^5$:$\eta^5$—C$_8$H$_6$)Co((C$_3$H$_7$)$_2$P(CH$_2$)$_3$P(C$_3$H$_7$)$_2$) (9c)

[Cp($\eta^8$-C$_8$H$_6$)(thf)Ti][B(C$_6$H$_5$)$_4$] (10a), [Ind($\eta^8$-C$_8$H$_6$)(thf)Ti][B(C$_6$H$_5$)$_4$] (10b),

[($\eta^5$—C$_8$H$_7$)($\eta^8$-C$_8$H$_6$)(thf)Ti][B(C$_6$H$_5$)$_4$] (10c)

Li[($\mu$—C$_8$H$_6$)Zr($\eta^8$-C$_8$H$_6$)(CH$_3$)] (11)

Cp($\eta^8$-C$_8$H$_6$)ZrCl (12a), Cp$^*$($\eta^8$-C$_8$H$_6$)ZrCl (12b), Cp($\eta^8$-C$_8$H$_5$CH$_3$)ZrCl (12c)

($\eta^8$-C$_8$H$_6$)$_2$Zr (13a), ($\eta^8$-C$_8$H$_5$CH$_3$)$_2$Zr (13b)

Cp($\eta^8$-C$_8$H$_6$)ZrH (15a), Cp($\eta^8$-C$_8$H$_6$)(CH$_3$)Zr (15b), Cp($\eta^8$-C$_8$H$_6$)(C$_6$H$_5$)Zr (15c), Ind($\eta^8$-C$_8$H$_6$)ZrCl (15d), Ind($\eta^8$-C$_8$H$_6$)(CH$_3$)Zr (15e), ($\eta^8$-C$_8$H$_6$)($\eta^3$—C$_3$H$_5$)$_2$Zr (15f), ($\eta^8$-C$_8$H$_6$)($\eta^4$—C$_4$H$_6$)(thf)Zr (15g)

[Cp($\eta^8$-C$_8$H$_6$)Zr(thf)][B(C$_6$H$_5$)$_4$] (16a), [($\eta^8$-C$_8$H$_6$)($\eta^3$—C$_3$H$_5$)(thf)$_2$Zr][B(C$_6$H$_5$)$_4$] (16b),

[($\eta^5$—C$_8$H$_7$)($\eta^8$-C$_8$H$_6$)(thf)Zr][B(C$_6$H$_5$)$_4$] (16c)

($\eta^8$-C$_8$H$_6$)(thf)$_2$ZrCl$_2$ (17a), ($\eta^8$-C$_8$H$_6$)($\eta^3$—C$_3$H$_5$)ZrCl (17b)

Cp($\eta^8$-C$_8$H$_6$)HfCl (18)

($\eta^8$-C$_8$H$_6$)$_2$Hf (19a), ($\eta^8$-C$_8$H$_5$CH$_3$)$_2$Hf (19b)

Cp($\eta^8$-C$_8$H$_6$)V (20a), Cp$^*$($\eta^8$-C$_8$H$_6$)V (20b), Ind($\eta^8$-C$_8$H$_6$)V (20c), Cp($\eta^8$-C$_8$H$_5$CH$_3$)V (20d), ($\eta^5$—C$_5$H$_4$Si(CH$_3$)$_3$)($\eta^8$-C$_8$H$_6$)V (20e)

($\eta^5$—C$_5$H$_4$Si(CH$_3$)$_3$)($\eta^8$-C$_8$H$_6$)Nb (21a), ($\eta^5$—C$_5$H$_4$Si(CH$_3$)$_3$)($\eta^4$—C$_8$H$_6$)(CO)$_2$Nb (21b), ($\eta^5$—C$_5$H$_4$Si(CH$_3$)$_3$)($\eta^8$-C$_8$H$_6$)((CH$_3$)$_2$PCH$_2$CH$_2$P(CH$_3$)$_2$)Nb (21c)

Cp$^*$($\eta^5$—C$_8$H$_6$)Cr (22)

Procedures for the preparation of some transition metal complexes having pentalene ligands bound to single metal atoms:

The preparation and handling of organometallic compounds were done with exclusion of air and moisture under argon as the protective gas (Schlenk technique). All required solvents were made anhydrous before use by refluxing over a desiccant for several hours followed by distillation under argon.

The 1,5-dihydropentalenes C$_8$H$_8$ and C$_8$H$_7$CH$_3$, required for the synthesis of the dilithium compounds Li$_2$[C$_8$H$_6$] and Li$_2$[C$_8$H$_5$CH$_3$] and the monolithium compound Li[C$_8$H$_7$], were prepared according to methods known from the literature (Synthesis 144 (1990)), and conversion to the corresponding anions was achieved by metallation with n-butyllithium in tetrahydrofuran.

The metallocene dichlorides Cp$_2$MCl$_2$ (M=Ti, Zr, Hf) and NbCl$_3$ (CH$_3$OCH$_2$CH$_2$OCH$_3$) as well as the employed transition metal halides ScCl$_3$, TiCl$_3$, ZrCl$_4$, VCl$_3$, VBr$_3$ and CrCl$_3$ are commercially available. Conversion of these halides to the corresponding tetrahydrofuran complexes was effected according to known procedures (J. Inorg. Nucl. Chem. 24, 1105 (1962); Inorg. Synth. 21, 135 (1982)); the preparation of CpTiCl$_2$ (J. Am. Chem. Soc. 83, 581 (1961)), Cp$_2$VX, Cp$^*$CPVX, Ind$_2$VX (X=Cl, Br) (Recl. Trav. Chim. Pays-Bas 80, 831 (1961); Angew.Chem. 98, 902 (1986)), $\eta$-(C$_5$H$_4$Si(CH$_3$)$_3$)$_2$NbCl (Organometallics 12, 1845 (1993)), and Cp$^*$((CH$_3$)$_2$NCH$_2$CH$_2$N(CH$_3$)$_2$)FeCl (Z. Naturforschung 50b, 394 (1995)) is also described in the literature.

Example 1

Preparation of Cp($\eta^8$-C$_8$H$_6$) (thf)Sc (1a)

ScCl$_3$ (466.5 mg, 3.1 mmol) was heated in tetrahydrofuran (THF) (50 ml) at 50° C. with stirring until a substantially clear solution was obtained. After addition of solid Li$_2$[C$_8$H$_6$] (372 mg, 3.2 mmol) at 0° C., the reaction mixture was heated at 50° C., cooled at 0° C. after about 1 h, and solid LiCp (237 mg, 3.3 mmol) was added. After heating at 50° C., the mixture was concentrated to dryness under oil-pump vacuum, the residue was taken up in toluene, and insoluble material was filtered off. After concentration of the filtrate, 1a precipitated at −30° C. in the form of yellow crystals which were separated, washed with pentane and

Example 2
Preparation of Cp($\eta^8$-C$_8$H$_6$)Ti (2a)

To CpTiCl$_2$ (4.96 g, 26.9 mmol) in THF (100 ml) was added solid Li$_2$[C$_8$H$_6$] (3.13 g, 26.9 mmol) at −40° C. The mixture was stirred until it reached room temperature, the THF was distilled off under oil-pump vacuum after 3 h, the residue was taken up in toluene, and the LiCl was filtered off. After concentration of the filtrate, 2a precipitated at −30° C. in the form of large dark crystals which were separated, washed with pentane and dried at room temperature under oil-pump vacuum. Yield: 3.86 g (66% of theory); MS (70 eV) m/z [%]: 215 (M$^+$) [100], 150 (M$^+$-Cp) [25]. The molecular structure of 2a was determined by X-ray cristallography.

Example 3
Preparation of Cp($\eta^8$-C$_8$H$_6$)TiBr (4b)

To a purple solution of Cp($\eta^8$-C$_8$H$_6$)Ti (2a) (3.32 g, 15.4 mmol) in THF (100 ml) was added 1,2-dibromoethane (0.67 ml, 7.7 mmol) at −20° C. The solution turned orange after a short period of time, and 4b crystallized. 4b was filtered off, washed with diethyl ether and dried at room temperature under oil-pump vacuum. Yield: 3.62 g (80% of theory). MS (70 eV) m/z [%]: 294 (M$^+$) [26], 229 (M$^+$-Cp) [54], 215 (M$^+$-Br) [100], 192 (M$^+$—C$_8$H6) [7], 150 (M$^+$-Cp-Br) [30].

The molecular structure of 4b was determined by X-ray cristallography.

Example 4
Preparation of Cp($\eta^8$-C$_8$H$_6$)ZrCl (12a) by the claimed process To Cp$_2$ZrCl$_2$ (10.67 g, 36.54 mmol) in THF (100 ml) was added solid Li$_2$[C$_8$H$_6$] (4.278 g, 36.87 mmol) at −5° C. with stirring whereupon the color turned yellow immediately. The reaction mixture was kept at room temperature for 6 h with stirring, followed by concentration at 35° C. under oil-pump vacuum until crystallisation of 12a began. Then, the mixture was heated at about 40° C., and the resultant clear solution was allowed to stand at −30° C. The precipitated crystals were separated from the mother liquor, washed at −78° C. with a small amount of precooled THF and diethyl ether and dried at room temperature under oil pump vacuum. Yield: 6.18 g (58% of theory). MS (70 eV) m/z [%]: 292 (M$^+$) [65], 257 (M$^+$-Cl) [10], 227 (M$^+$-Cp) [100]. $^1$H-NMR (200 MHz, [D$^8$]THF, 27° C.): 6.03 (5H, Cp); 6.60, 5.76, 5.25 (6H, $\eta^8$-C$_8$H$_6$).

The molecular structure of 12a was determined by X-ray cristallography.

Example 5
Preparation of ($\eta^8$-C$_8$H$_6$)$_2$Zr (13a) by the claimed process To Cp$_2$ZrCl$_2$ (9.96 g, 34.1 mmol) in THF (200 ml) was added solid Li$_2$[C$_8$H$_6$] (8.03 g, 69.2 mmol) at 0° C. with stirring. The reaction was allowed to continue for 10 h at room temperature, and the precipitated yellow product was filtered off. It was washed several times with THF and dried under oil pump vacuum. Yield: 8.8 g (88% of theory). MS (70 eV) m/z [%]: 294 (M$^+$) [100], 192 (M$^+$—C$_8$H$_6$) [19]. $^1$H-NMR (200 MHz, [D$^8$]THF, 27° C.): 5.67, 5.24 (12H, $\eta^8$-C$_8$H$_6$).

Example 6
Preparation of Cp($\eta^8$-C$_8$H$_6$)(CH$_3$)Zr (15b)

To Cp($\eta^8$-C$_8$H$_6$)ZrCl (12a) (2.03 g, 6.9 mmol) in THF (15 ml) was added a solution of methyl lithium (6.9 mmol) in ether at −20° C. The reaction solution turned red. After warming at room temperature, the mixture was concentrated to dryness, the residue was taken up in diethyl ether, and insoluble material was separated off by filtration. Crystals precipitated from the filtrate at −30° C. and were separated from the mother liquor, washed with pentane and dried at room temperature under oil pump vacuum. Yield: 1.09 g (58% of theory). MS (70 eV) m/z [%]: 272 (M$^+$) [7], 257 (M$^+$—CH$_3$) [100], 205 (M$^+$-Cp) [11], 192 (M$^+$-Cp-CH$_3$) [11]. $^1$H-NMR (200 MHz, [D$^8$]THF, 27° C.): −0.79 (3H, CH$_3$); 6.12, 5.53, 5.18 (6H, $\eta^8$-C$_8$H$_6$); 5.79 (5H, Cp).

Example 7
Preparation of ($\eta^8$-C$_8$H$_6$) (thf)$_2$ZrCl$_2$ (17a) by comproportionation of 13a with ZrCl$_4$(thf)$_2$ To ($\eta^8$-C$_8$H$_6$)$_2$Zr (13a) (7.11 g, 24.1 mmol) in THF (500 ml) was added dropwise a solution of ZrCl$_4$(thf)$_2$ (9.73 g, 25.8 mmol) in THF (200 ml) in the course of 15 h with stirring at room temperature. Subsequent heating at 45° C. yielded a clear yellow solution from which 17a crystallized at −30° C. in the form of colorless needles. They were separated from the mother liquor, washed twice with a small amount of THF at −78° C. and dried at room temperature under oil pump vacuum. Yield: 14.8 g (75% of theory). $^1$H-NMR (200 MHz, [D$^8$]THF, 27° C.): 6.50, 5.58 (6H, $\eta^8$-C$_8$H$_6$).

The molecular structure of 17a was determined by X-ray cristallography.

Example 8
Preparation of Cp($\eta^8$-C$_8$H$_6$)V (20a) by the claimed process To Cp$_2$VCl (14.89 g, 68.8 mmol) in THF (200 ml) was added solid Li$_2$[C$_8$H$_6$] (8.16 g, 70.3 mmol) at −78° C. with stirring. The initially blue solution turned purple upon warming at room temperature. After 2 h, the THF was removed by distillation under oil pump vacuum, the residue was taken up in toluene, and the LiCl and LiCp were filtered off. After concentration of the filtrate, 20 a precipitated at −30° C. in the form of large crystals which were separated, washed with pentane and dried at room temperature under oil pump vacuum. Yield: 13.2 g (88% of theory). MS (70 eV) m/z [%]: 218 (M$^+$) [100], 153 (M$^+$-Cp) [27], 116 (M$^+$—C$_8$H$_6$) [13]. $^1$H-NMR (200 MHz, [D$^8$]THF, 27° C.): 4.47 (5H, Cp), 5.14, 5.02 (6H, $\eta^8$-C$_8$H$_6$).

The molecular structure of 20a was determined by X-ray cristallography.

b) The following novel transition metal complexes having no pentalene ligands bound to single metal atoms have been prepared from complexes having pentalene ligands bound to single metal atoms:
($\eta^5$-C$_8$H$_7$)$_2$TiCl$_2$ (23)
($\eta^5$-C$_8$H$_7$)$_2$ZrCl$_2$ (24a), ($\eta^5$-C$_8$H$_6$Si(CH$_3$)$_3$)$_2$ZrCl$_2$ (24b), ($\eta^5$-C$_8$H$_6$B(C$_2$H$_5$)$_2$)$_2$ZrCl$_2$ (24c)
[(((CH$_3$)$_2$NCH$_2$CH$_2$N(CH$_3$)$_2$)Li][($\mu$—C$_8$H$_6$)ZrCp (CH$_3$)$_2$] (25)
Cp(CH$_3$)$_2$Zr($\mu$-$\eta^5$:$\eta^5$-C$_8$H$_6$)FeCp$^*$ (26a),
Cp(CH$_3$)$_2$Zr($\mu$-$\eta^5$:$\eta^5$-C$_8$H$_6$)Co($\eta^4$—1,5-cyclooctadiene) (26b)
Li$_2$[($\mu$-C$_8$H$_6$)$_2$Zr(CH$_3$)$_2$] (27)
($\eta^5$-CH$_6$D)$_2$(CH$_3$)$_2$Zr (28)

Procedure for the synthesis of 26a as an example of a dinuclear transition metal complex having a pentalene bridge:

Example 9
Preparation of Cp(CH$_3$)$_2$Zr($\mu$—$\eta^5$:$\eta^5$—C$_8$H$_6$)FeCp* (26a)

To Cp($\eta^8$-C$_8$H$_6$)(CH$_3$)Zr (15b) (1.31 g, 4.8 mmol) in THF (30 ml) was added dropwise a solution of methyl lithium (4.8 mmol) in ether at −78° C. with stirring. The reaction solution was allowed to warm to room temperature, and the reaction to continue for 1 h. To this red solution of Li[($\mu$—$\eta^5$:$\eta^5$—C$_8$H$_6$) ZrCp(CH$_3$)$_2$] (25) in THF was added solid Cp*((CH$_3$)$_2$NCH$_2$CH$_2$N(CH$_3$)$_2$)FeCl (1.64 g, 4.8 mmol) at −78° C. The reaction was allowed to continue at room temperature for 1 h, the solution was then concentrated to dryness, and the residue was taken up in hexane. After separating insoluble material by filtration, crystals precipitated from the filtrate at −30° C. They were separated from the mother liquor, washed twice with pentane at −78° C. and dried at room temperature under oil pump vacuum. Yield: 1.66 g (72% of theory). MS (70 eV) m/z [%]: 478 (M$^+$) [50], 463 (M$^+$—CH$_3$) [46]. $^1$H-NMR (200 MHz, [D$^8$]Toluol, 27° C.): 5.81, 5.30, 3.97, 3.32 (6H, $\eta^8$—C$_8$H$_6$); 1.66 (15H, Cp*)−−0.39 (6H, CH$_3$).

2. Catalytic polymerization of ethene

For experiments 10–12, a 500 ml glass autoclave equipped with an agitator was used. The stirring rate was 1500 rpm. The methylaluminoxane was dissolved in toluene (10%, corresponding to C$_{Al}$=1.7 mol/l, average degree of oligomerization n=17.2).

Example 10

Toluene (300 ml) was saturated with ethene (2 bar) at 30° C., and to initiate the polymerization, a solution was added which had been prepared previously by reaction of the zirconium compound 17a (20.0 mg, 49 $\mu$mol) with methylaluminoxane (8.64 ml, 12.99 mmol of Al) dissolved in toluene for half an hour (Zr:Al=1:400). The polymerization proceeded at 30° C. with a constant pressure of ethene and was quenched after 1 h by addition of methanol. After washing with methanol and drying under oil-pump vacuum, a polymer (2.17 g) was obtained as the product which was linear polyethylene as revealed by the infrared spectrum. The amount of isolated polymer corresponded to a catalyst activity of 458 g of polyethylene per g of zirconium and per hour.

Example 11

In analogy to Example 10 with: toluene (200 ml), 15f as the zirconium compound (20.8 mg, 75 $\mu$mol), methylaluminoxane (46.87 ml, 75 mmol of Al), Zr:Al=1:1000, 25 min reaction time. The amount of isolated polymer (19.46 g) corresponded to a catalyst activity of 6474 g of linear polyethylene per g of zirconium and per hour.

Example 12

A mixture of methylaluminoxane (5.95 ml, 10.16 mmol of Al) dissolved in toluene and toluene (100 ml) was charged into an autoclave and saturated with ethene (2 bar) at 30° C.; otherwise, the procedure was in analogy to Examples 10 and 11 with: 15d as the zirconium compound (5 mg, 14.5 $\mu$mol), methylaluminoxane (2.6 ml, 4.42 mmol of Al), 30 min reaction time. The amount of isolated polymer (10.29 g) corresponded to a catalyst activity of 31,531 g of linear polyethylene per g of zirconium and per hour.

We claim:

1. A complex compound having at least one transition metal atom, wherein said complex compound comprises at least one pentalene or substituted pentalene ligand which is coordinated to only one single metal atom.

2. A complex compound of general formulae I, II, III or IV,

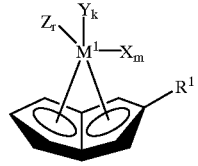

I

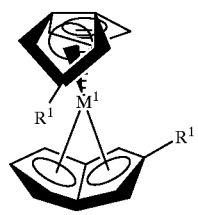

II

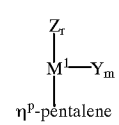

III $\eta^p$-pentalene

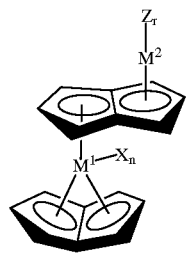

IV wherein

M$^1$ and M$^2$ are the same or different metal atoms, at least one of the atoms being from the groups 3 to 6, R$^1$, R$^2$ are independently H or methyl, X is halogen, alkyl, aryl or H, Y is THF, amine, phosphane or CO, Z is a $\pi$-ligand, k is 0, 1 or 2, m is 0, 1, 2 or 3, n is 0 or 1, r is 0, 1 or 2, and $2 \leq p \leq 8$.

3. The complex according to claim 2, wherein Z is a $\pi$-ligand selected from the group consisting of cyclopentadienyl, dihydropentalenyl, indenyl and allyl.

4. The complex compound according to claim 2, wherein M$^1$ or both M$^1$ and M$^2$ are selected from scandium, titanium, zirconium, hafnium, vanadium, niobium and chromium and may be the same or different.

5. The complex compound according to claim 1, said complex compound being selected from the group consisting of Cp($\eta^8$—C$_8$H$_6$)(thf)Sc,
Cp*($\eta^8$—C$_8$H$_6$)(thf)Sc,
Ind($\eta^8$—C$_8$H$_6$)(thf)Sc,
Cp($\eta^8$—C$_8$H$_6$)Ti,
Cp*($\eta^8$—C$_8$H$_6$)Ti,
Ind($\eta^8$—C$_8$H$_6$)Ti,
($\eta^5$—C$_8$H$_7$)($\eta^8$—C$_8$H$_6$)Ti,
Cp($\eta^8$—C$_8$H$_5$CH$_3$)Ti,
($\eta^8$—C$_8$H$_6$)$_2$Ti,
($\eta^8$—C$_8$H$_5$CH$_3$)$_2$Ti,
Cp($\eta^8$—C$_8$H$_6$)TiCl,
Cp($\eta^8$—C$_8$H$_6$)TiBr,
Ind($\eta^8$—C$_8$H$_6$)TiCl,
Ind($\eta^8$—C$_8$H$_6$)TiBr,
($\eta^5$—C$_8$H$_7$)($\eta^8$—C$_8$H$_6$)TiCl,
($\eta^5$—C$_8$H$_7$)($\eta^8$—C$_8$H$_6$)TiBr,
($\eta^8$—C$_8$H$_6$)((CH$_3$)$_2$PCH$_2$CH$_2$P(CH$_3$)$_2$)TiCl$_2$,
Cp($\eta^8$—C$_8$H$_5$CH$_3$)TiCl,
Cp($\eta^8$—C$_8$H$_5$CH$_3$)TiBr,
Li[($\mu$—C$_8$H$_6$)Ti($\eta^8$—C$_8$H$_6$)],
($\eta^5$—C$_8$H$_6$D)($\eta^8$—C$_8$H$_6$)Ti,
($\eta^8$—C$_8$H$_6$)Ti($\mu$—$\eta^5$:$\eta^5$—C$_8$H$_6$)FeCp*,
($\eta^8$—C$_8$H$_6$)Ti($\mu$—$\eta^5$:$\eta^5$—C$_8$H$_6$)CoCp*,
($\eta^8$—C$_8$H$_6$)TiCl($\mu$—$\eta^5$:$\eta^5$—C$_8$H$_6$)Co($\eta^4$-1,5-cycloocta diene),
($\eta^8$—C$_8$H$_6$)Ti($\mu$—$\eta^5$:$\eta^5$—C$_8$H$_6$)Co((C$_3$H$_7$)$_2$P(CH$_2$)$_3$P(C$_3$H$_7$)$_2$),
($\eta^5$—C$_8$H$_6$Si(CH$_3$)$_3$)($\eta^8$—C$_8$H$_6$)TiCl,
($\eta^5$—C$_8$H$_6$Si(CH$_3$)$_3$)($\eta^8$—C$_8$H$_6$)TiBr,
($\eta^8$—C$_8$H$_6$)TiCl($\mu$—$\eta^5$:$\eta^5$—C$_8$H$_6$)FeCp*,
Li[($\mu$—C$_8$H$_6$)Ti($\eta^8$—C$_8$H$_6$)(CH$_3$)],
($\eta^5$—C$_8$H$_6$D)($\eta^8$—C$_8$H$_6$)(CH$_3$)Ti,
($\eta^8$—C$_8$H$_6$)(CH$_3$)Ti($\mu$—$\eta^5$:$\eta^5$—C$_8$H$_6$)FeCp*,
($\eta^8$—C$_8$H$_6$)(CH$_3$)Ti($\mu$—$\eta^5$:$\eta^5$—C$_8$H$_6$)Co((C$_3$H$_7$)$_2$P(CH$_2$)$_3$P(C$_3$H$_7$)$_2$),
[Cp($\eta^8$—C$_8$H$_6$)(thf)Ti][B(C$_6$H$_5$)$_4$],
[Ind($\eta^8$—C$_8$H$_6$)(thf)Ti][B(C$_6$H$_5$)$_4$],
[($\eta^5$—C$_8$H$_7$)($\eta^8$—C$_8$H$_6$)(thf)Ti][B(C$_6$H$_5$)$_4$],
Cp($\eta^8$—C$_8$H$_6$)ZrCl,
Cp*($\eta^8$—C$_8$H$_6$)ZrCl,
Cp($\eta^8$—C$_8$H$_5$CH$_3$)ZrCl,
($\eta^8$—C$_8$H$_5$)$_2$Zr,
($\eta^8$—C$_8$H$_5$CH$_3$)$_2$Zr,
Li[($\mu$—C$_8$H$_6$)Zr($\eta^8$—C$_8$H$_6$)(CH$_3$)],
($\eta^8$—C$_8$H$_6$)(CH$_3$)Zr($\mu$—$\eta^5$:$\eta^5$—C$_8$H$_6$)FeCp*,
Cp($\eta^8$—C$_8$H$_6$)ZrH,
Cp($\eta^8$—C$_8$H$_6$)(CH$_3$)Zr,
Cp($\eta^8$—C$_8$H$_6$)(C$_6$H$_5$)Zr,
Ind($\eta^8$—C$_8$H$_6$)ZrCl,
Ind($\eta^8$—C$_8$H$_6$)(CH$_3$)Zr,
($\eta^8$—C$_8$H$_6$)($\eta^3$—C$_3$H$_5$)$_2$Zr,
($\eta^8$—C$_8$H$_6$)($\eta^4$—C$_4$H$_8$)(thf)Zr,
[Cp($\eta^8$—C$_8$H$_6$)Zr(thf)][B(C$_6$H$_5$)$_4$],
[($\eta^8$—C$_8$H$_6$)($\eta^3$—C$_3$H$_5$)(thf)$_2$Zr][B(C$_6$H$_5$)$_4$],
[($\eta^5$—C$_8$H$_7$)($\eta^8$—C$_8$H$_6$)(thf)Zr][B(C$_6$H$_5$)$_4$],
($\eta^8$—C$_8$H$_6$)(thf)$_2$ZrCl$_2$,
($\eta^8$—C$_8$H$_6$)($\Theta^3$—C$_3$H$_5$)ZrCl,
Cp($\eta^8$—C$_8$H$_6$)HfCl,
($\eta^8$—C$_8$H$_6$)$_2$Hf,
($\eta^8$—C$_8$H$_5$CH$_3$)$_2$Hf,
Cp($\eta^8$—C$_8$H$_6$)V,
Cp*($\eta^8$—C$_8$H$_6$)V,
Ind($\eta^8$—C$_8$H$_6$)V,
Cp($\eta^8$—C$_8$H$_5$CH$_3$)V,
($\eta^5$—C$_5$H$_4$Si(CH$_3$)$_3$)($\eta^8$—C$_8$H$_6$)V,
($\eta^5$—C$_5$H$_4$Si(CH$_3$)$_3$)($\eta^8$—C$_8$H$_6$)Nb,
($\eta^5$—C$_5$H$_4$Si(CH$_3$)$_3$)($\eta^4$—C$_8$H$_6$)(CO)$_2$Nb,
($\eta^5$—C$_5$H$_4$Si(CH$_3$)$_3$)($\eta^8$—C$_8$H$_6$)((CH$_3$)$_2$PCH$_2$CH$_2$P(CH$_3$)$_2$)Nb,
Cp*($\eta^5$—C$_8$H$_6$)Cr.

6. A transition metal complex, which is derived from a complex compound according to claim 1 by chemical reaction, all pentalene or substituted pentalene ligands being replaced by dihydropentalenyl or substituted dihydropentalenyl ligands or by bridging pentalene or bridging substituted pentalene ligands.

7. The transition metal complex according to claim 6 wherein said transition metal complex is selected from the group consisting of
($\eta^5$—C$_8$H$_7$)$_2$TiCl$_2$,
($\eta^5$—C$_8$H$_7$)$_2$ZrCl$_2$,
($\eta^5$—C$_8$H$_6$Si(CH$_3$)$_3$)$_2$ZrCl$_2$,
($\eta^5$—C$_8$H$_6$B(C$_2$H$_5$)$_2$)$_2$ZrCl$_2$,
[((CH$_3$)$_2$NCH$_2$CH$_2$N(CH$_3$)$_2$)Li][($\mu$—C$_8$H$_6$)ZrCp(CH$_3$)$_2$],
Cp(CH$_3$)$_2$Zr($\mu$—$\eta^5$:$\eta^5$—C$_8$H$_6$)FeCp*,
Cp(CH$_3$)$_2$Zr($\mu$—$\eta^5$:$\eta^5$—C$_8$H$_6$)Co($\eta^4$-1,5-cycloocta diene),
Li$_2$[($\mu$—C$_8$H$_6$)$_2$Zr(CH$_3$)$_2$],
($\eta^5$—C$_8$H$_6$D)$_2$(CH$_3$)$_2$Zr.

8. A process for the preparation of a complex compound according to claim 1 comprising reacting a transition metal compound which has at least one halogeno and at least one cyclopentadienyl, substituted cyclopentadienyl, or indenyl ligand with a pentalene dianion or a substituted pentalene dianion which replaces one halogeno ligand and one cyclopentadienyl, substituted cyclopentadienyl, or indenyl ligand.

9. In a process for the preparation of polyolefins comprising polymerizing olefins with the aid of a catalyst, wherein the improvement comprises using as said catalyst a catalyst comprising at least one complex compound according to claim 1.

10. A transition metal complex, which is derived from a complex compound according to claim 2 by chemical reaction, all pentalene or substituted pentalene ligands being replaced by dihydropentalenyl or substituted dihydropentalenyl ligands or by bridging pentalene or bridging substituted pentalene ligands.

11. A process for the preparation of a complex compound according to claim 2 comprising a transition metal compound which has at least one halogeno and at least one cyclopentadienyl, substituted cyclopentadienyl, or indenyl ligand with a pentalene dianion or a substituted pentalene dianion which replaces one halogeno ligand and one cyclopentadienyl, substituted cyclopentadienyl, or indenyl ligand.

12. In a process for the preparation of polyolefins comprising polymerizing olefins with the aid of a catalyst, wherein the improvement comprises using as said catalyst a catalyst comprising at least one complex compound according to claim 6.

13. In a process for the preparation of polyolefins comprising polymerizing olefins with the aid of a catalyst, wherein the improvement comprises using as said catalyst a catalyst comprising at least one complex compound according to claim 10.

14. A cationic or anionic complex compound having at least one transition metal atom, wherein said complex compound comprises at least one pentalene or substituted pentalene ligand which is coordinated to only one single metal atom.

\* \* \* \* \*

UNITED STATES PATENT AND TRADEMARK OFFICE
CERTIFICATE OF CORRECTION

PATENT NO. : 5,959,132
DATED : September 28, 1999
INVENTOR(S) : Klaus Jonas et al.

It is certified that error appears in the above-identified patent and that said Letters Patent is hereby corrected as shown below:

Column 10,
Line 24, change structural drawing from;   to

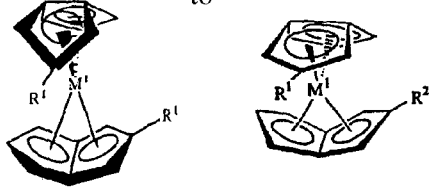

Column 12,
Line 61, after "comprising" insert -- reacting --

Signed and Sealed this

Ninth Day of September, 2003

JAMES E. ROGAN
*Director of the United States Patent and Trademark Office*